US006067898A

United States Patent [19]

Lin

[11] Patent Number: 6,067,898

[45] Date of Patent: May 30, 2000

[54] RICE VENDING MACHINE

[76] Inventor: Chun-Yuan Lin, No. 358, Ta-Li Road, Ta-Li City, Taichung Hsien, Taiwan

[21] Appl. No.: 09/337,646

[22] Filed: Jun. 22, 1999

[51] Int. Cl.[7] ................................ A23L 1/00; A23B 9/00; B02B 5/00; G07F 9/10; G07F 11/00

[52] U.S. Cl. ................................ 99/357; 99/355; 99/470; 99/476; 99/484; 221/150 R; 221/150 HC

[58] Field of Search ............................ 99/331, 339, 340, 99/352–355, 357, 403–418, 447, 467–476, 483, 484, 470, 485; 221/150 A, 150 HC, 150 R, 151, 133; 426/462, 231–233, 523, 618, 622, 629, 634

[56] References Cited

U.S. PATENT DOCUMENTS

| | | | |
|---|---|---|---|
| 3,313,450 | 4/1967 | Erickson | 99/357 X |
| 3,381,605 | 5/1968 | Smith | 221/150 HC |
| 3,425,339 | 2/1969 | Fleischman et al. | 99/357 |
| 3,928,045 | 12/1975 | Tsunoda et al. | 21/150 R |
| 3,932,723 | 1/1976 | Tamano et al. | 99/355 X |
| 4,030,632 | 6/1977 | Harashima | 221/150 A |
| 4,331,068 | 5/1982 | Asami | 99/483 X |
| 4,338,344 | 7/1982 | Brooks et al. | 426/618 X |
| 4,919,950 | 4/1990 | Mak | 426/233 |
| 4,934,259 | 6/1990 | Watanabe | 99/339 |
| 5,101,717 | 4/1992 | Morille | 99/485 X |
| 5,385,083 | 1/1995 | Toyokura | 99/355 |
| 5,522,310 | 6/1996 | Black, Sr. et al. | 99/357 |

*Primary Examiner*—Timothy Simone
*Attorney, Agent, or Firm*—Rosenberg, Klein & Lee

[57] ABSTRACT

A rice vending machine includes a housing, a rice container, a packing unit and a controlling unit. The controlling unit and the cooperative packing unit make it possible to adjust the amount of the purchased rice as necessary. Therefore, the rice can be more freshly and hygienically reserved without waste. Without man, the rice vending machine can sell the rice without limitation of site and business time so as to lower rice selling cost.

9 Claims, 6 Drawing Sheets

RICE VENDING MACHINE

BACKGROUND OF THE INVENTION

The present invention relates to a rice vending machine in which a controlling unit and a cooperative packing unit make it possible to adjust the amount of the purchased rice as necessary.

Generally, rice is reserved at normal temperature. However, after skinned, the rice is quite easy to dehydrate. Especially, after a period of reservation, the rice is subject to ambient temperature and humidity change and tends to lose freshness and deteriorated. No matter whether the rice is purchased from a rice store or from a supermarket in a packed pattern, the rice has been all reserved for a certain period of time. In the case that the purchaser fails to eat up the rice in a short term, the taste of the rice will be deteriorated and become poor or even weevils will grow to corrode the rice. In addition, most of the places where the rice is purchased are large supermarket. Due to limitation of business time, it is not so convenient for a consumer to buy the rice. Also, it is a waste for those families including fewer members or rarely cooking to purchase an entire pack of rice.

SUMMARY OF THE INVENTION

It is therefore a primary object of the present invention to provide a rice vending machine in which a controlling unit and a cooperative packing unit make it possible to adjust the amount of the purchased rice as necessary. Therefore, the rice can be more freshly and hygienically reserved without waste. Without man, the rice vending machine can sell the rice without limitation of site and business time so as to lower rice selling cost.

It is a further object of the present invention to provide the above rice vending machine which can be conveniently supplemented with rice.

DETAILED DESCRIPTION OF THE PREFERRED EMBODIMENT

Figure 1:
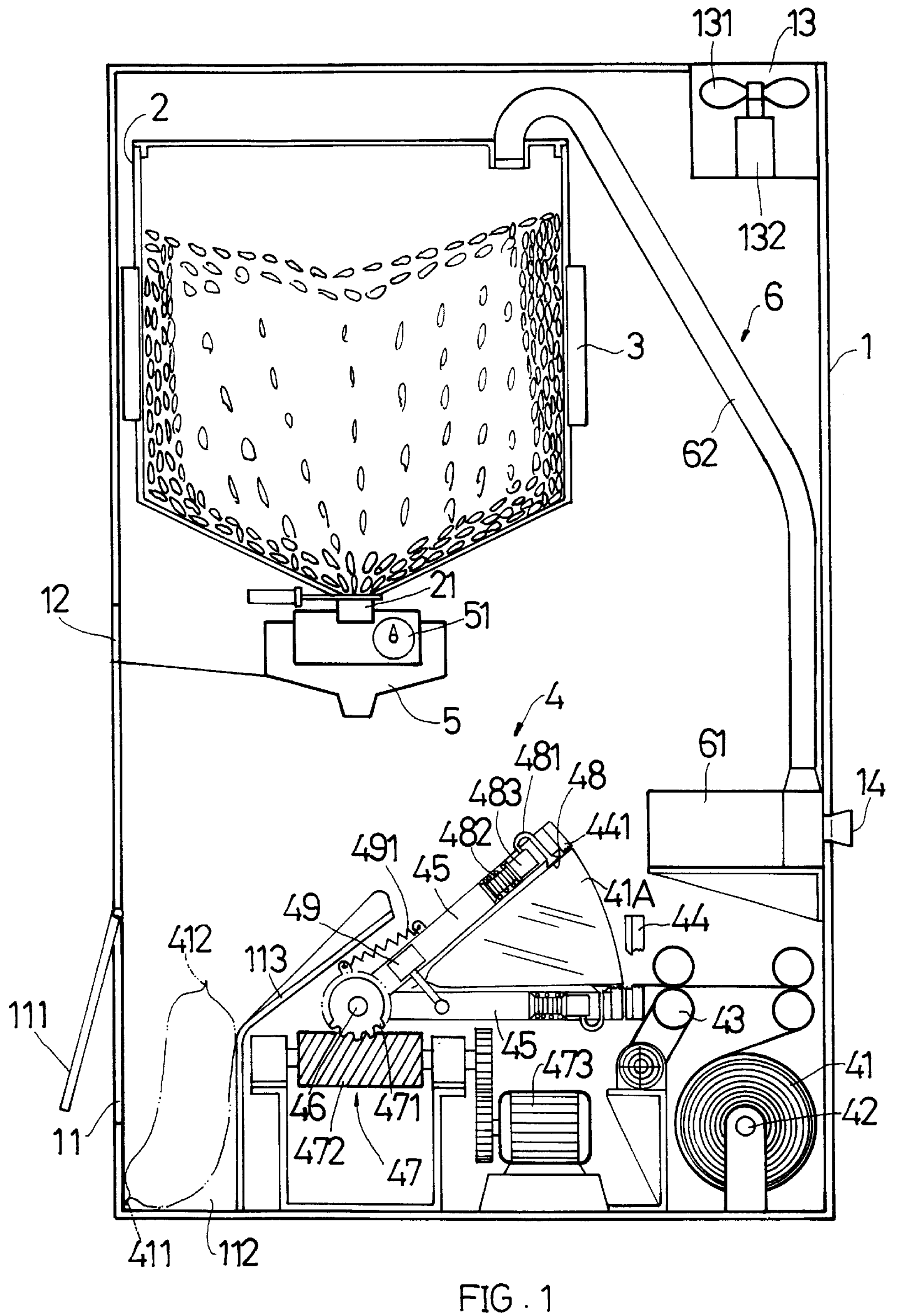
FIG. 1 is a plane view of the present invention, showing the operation in one state.
Figure 2:
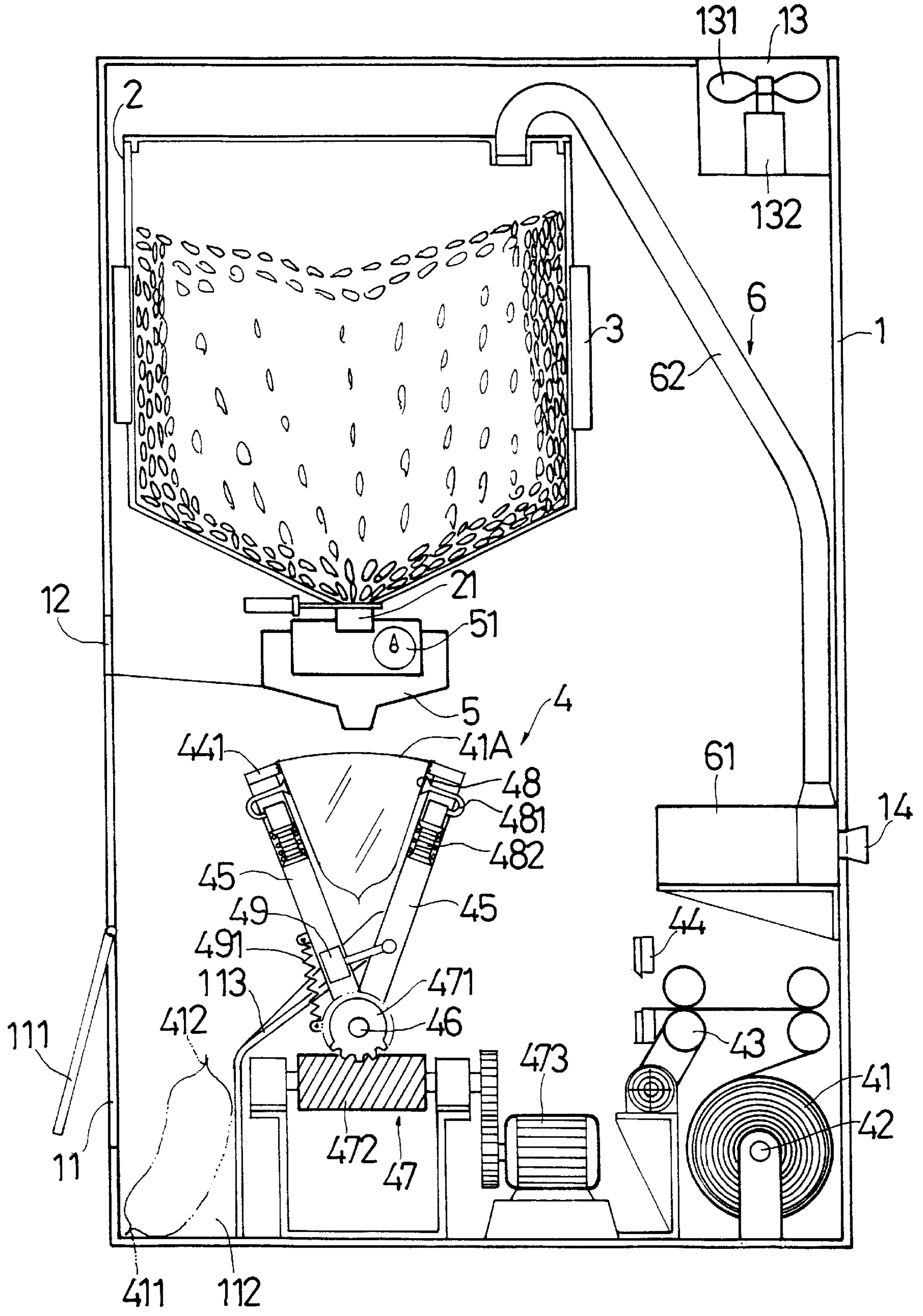
FIG. 2 is a plane view of the present invention, showing the operation in another state.
Figure 3:
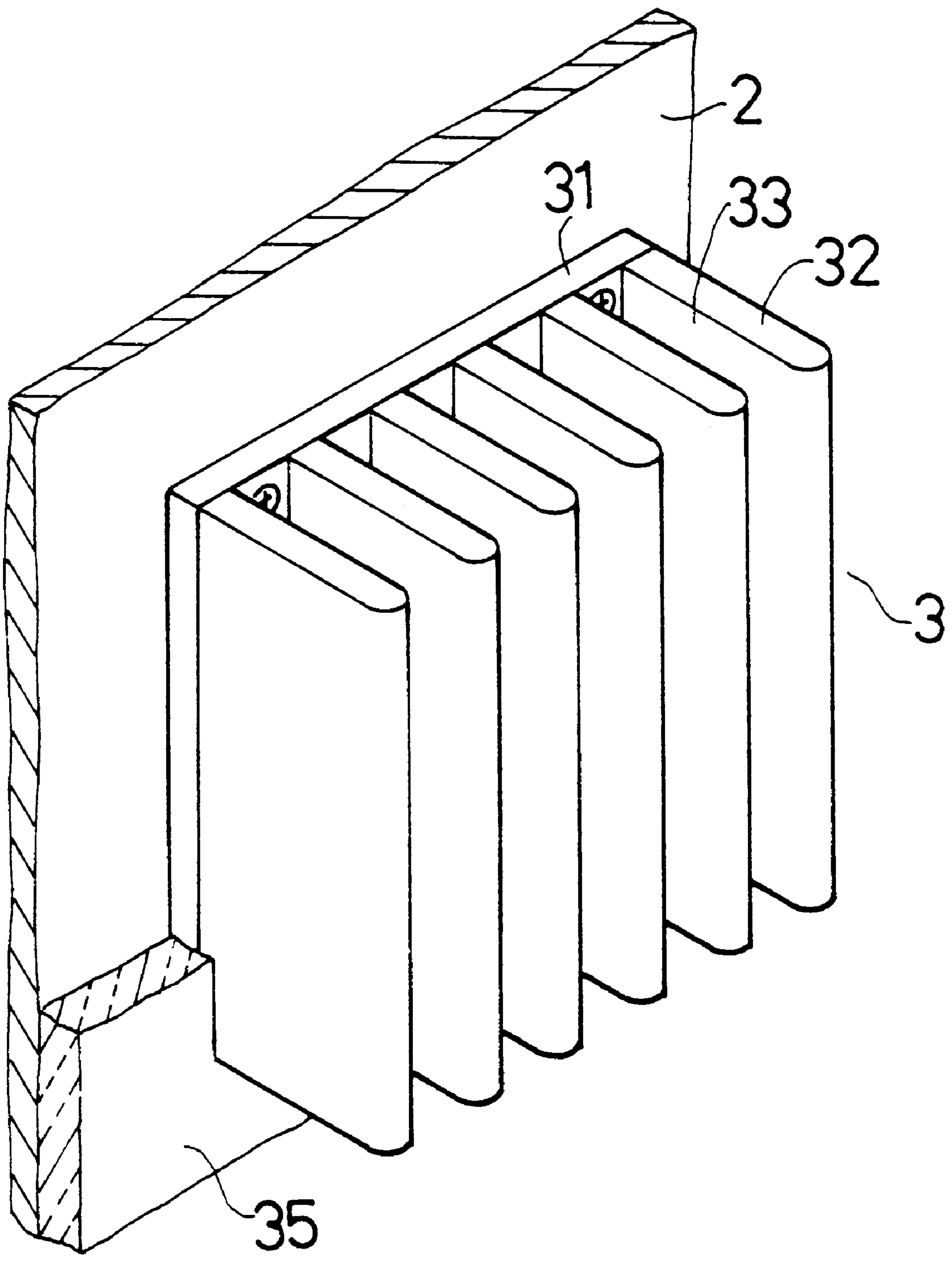
FIG. 3 is a perspective view of the cooling unit of the present invention.

Please refer to FIGS. 1 to 8. The rice vending machine of the present invention includes:

a housing 1 a front face of which is formed with a taking opening 11 and a coin slit 12, a top face of the housing 1 being formed with a heat radiating opening 13, a lateral face of the housing 1 being formed with a supplementing opening 14, the taking opening 11 being covered by a cover 111 and communicated with a taking receptacle 112, a fan 131 driven by a power source 132 being disposed at the heat radiating opening 13 for exhausting the heat from the housing 1;

a rice container 2 for containing rice therein, a releasing port 21 being disposed on lower side of the rice container 2, multiple cooling units 3 being disposed on outer side of the rice container 2, the rice container 2 being enclosed by a thermal retardation layer 35, as shown in FIG. 3, the cooling unit 3 including a cooling chip 31 and multiple heat radiating fins 32, the cooling chip 31 being a good heat conductor and fixed on outer side of the rice container 2, the heat radiating fins 32 being parallelly disposed on the cooling chip 31 at equal intervals in contact with the cooling chip 31, a ventilation space 33 being defined between the heat radiating fins 32, which communicates with external environment, the cooling unit 3 serving to exchange the heat from the interior of the rice container 2 to external environment so as to keep the temperature in the rice container 2 at a low temperature;

a packing unit 4 disposed under the rice container 2 for transferring, clamping, planing, cutting, stretching and sealing a packing belt 41, in this embodiment, the packing belt 41 being disposed on a belt reel 42, the packing unit 4 including multiple rollers 43 and a bottom thermally sealing cutter 44 positioned at the end of the travel of the packing belt 41, a pair of transferring arms 45 being disposed on one side of the cutter 44, the transferring arm 45 being formed with a central hollow section 451 and pivotally connected with a rotary shaft 46 driven by a gear set 47, the gear set 47 at least including a gear 471 disposed on the rotary shaft 46, a spiral rod 472 meshing with the gear 471 and a rotary power source 473, a free end of the transferring arm 45 being disposed with a top thermally sealing cutter 441.

Figure 6:
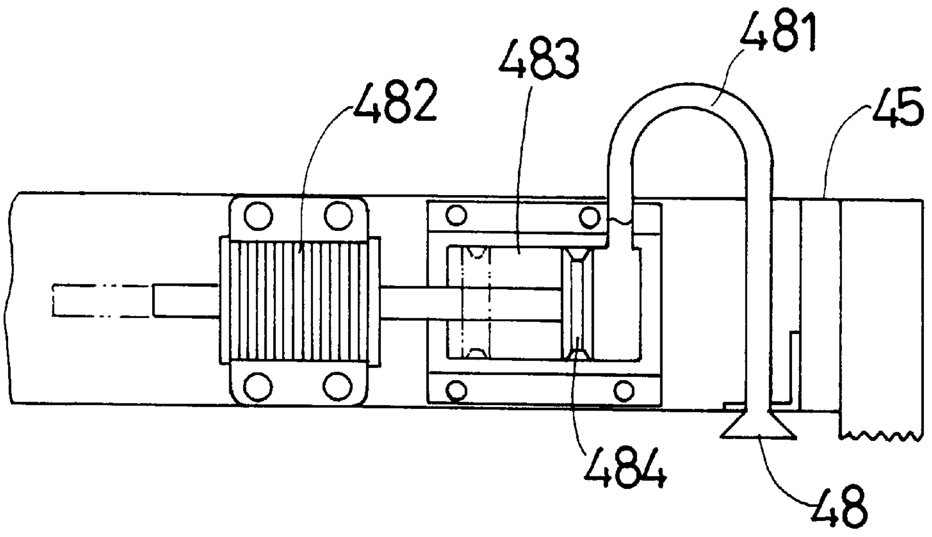
FIG. 6 shows the sucking member and electromagnetic valve of the present invention.

As shown in FIG. 6, an inner side of each transferring arm 45 distal from the rotary shaft 46 is disposed with a sucking member 48 communicated with a sucking room 483 and a pump 484 via a communicating tube 481. The pump 484 is activated by an electromagnetic valve 482. A stretching power source 49 and an angle controlling spring 491 are disposed between the two transferring arms 45. By means of the electromagnetic valve 482, the air pressure in the sucking room 483 is changed, enabling the sucking member 48 to create a sucking force. The stretching power source 49 is activated to stretch the two transferring arms 45 to contain a certain angle so as to stretch the packing belt 41A. One end of the angle controlling spring 491 is disposed at one transferring arm 45, while the other end thereof is disposed at the rotary shaft 46. The angle controlling spring 491 serves to keep the transferring arms 45 containing a constant angle for facilitating the operation of the stretching power source 49.

The rollers 43 serve to transfer, clamp and plane the packing belt 41 at front section of the travel. The bottom thermally sealing cutter 44 serves to seal the bottom opening and cut into a packing bag 41A. The transferring arms 45 serve to transfer and stretch the packing bag 41A. The top thermally sealing cutter 441 serves to seal the top opening of the packing bag 41A. The hollow section 451 of the transferring arm 45 permits the packing bag 41A to be placed in a guide way 113 of the taking receptacle 112, whereby the packed rice can be taken out from the taking opening 11.

The present invention further includes a controlling unit 5 including a metering section 51 and an operation section 52.

Figure 4:
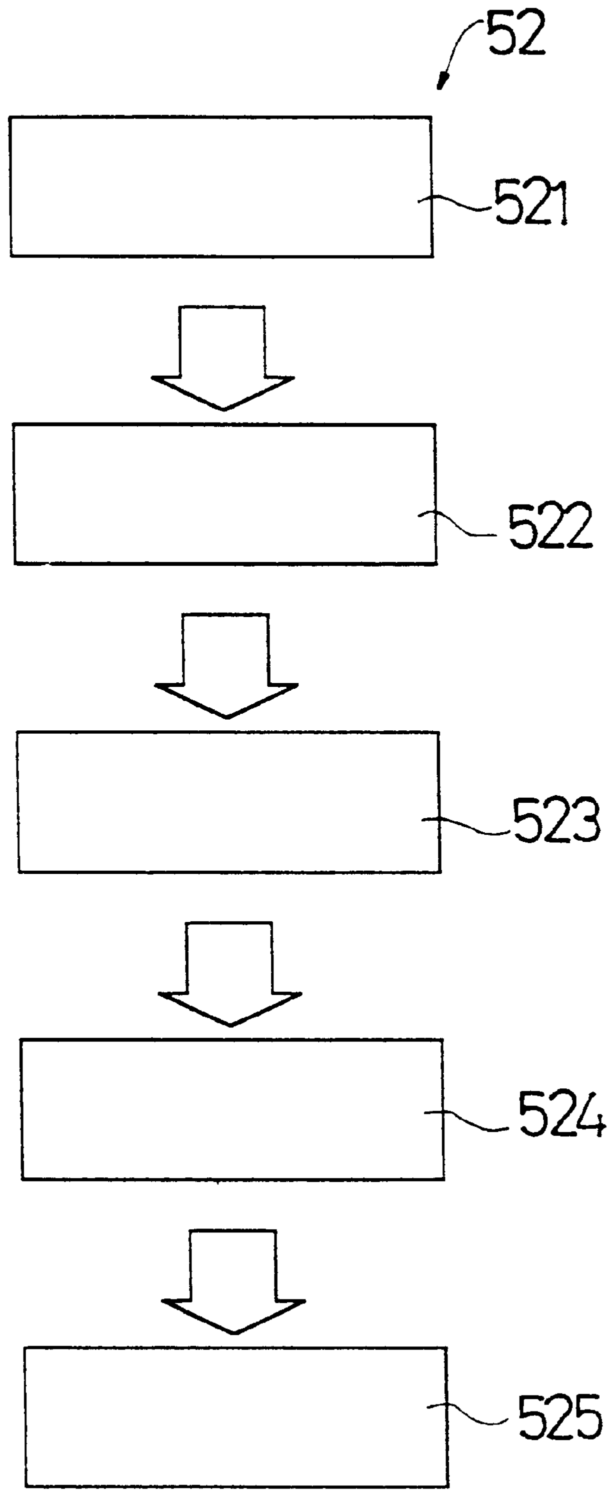
FIG. 4 is a flow chart of the operation of the operation section of the present invention.
Figure 5:
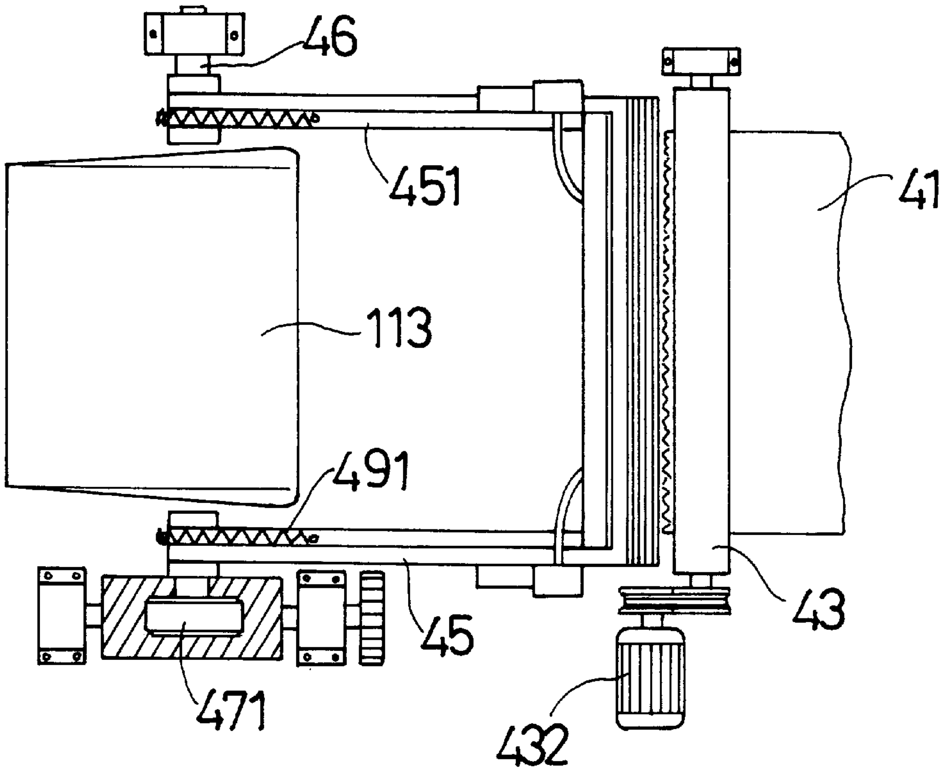
FIG. 5 shows the hollow section of the transferring arm of the present invention.
Figure 7:
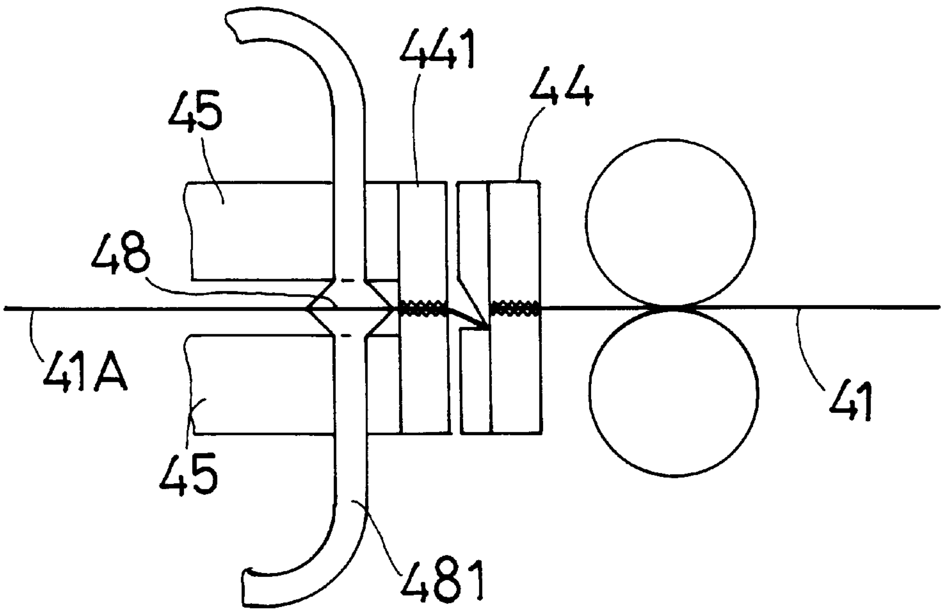
FIG. 7 shows that the transferring arms of FIG. 1 cut off the packing bag.
Figure 8:
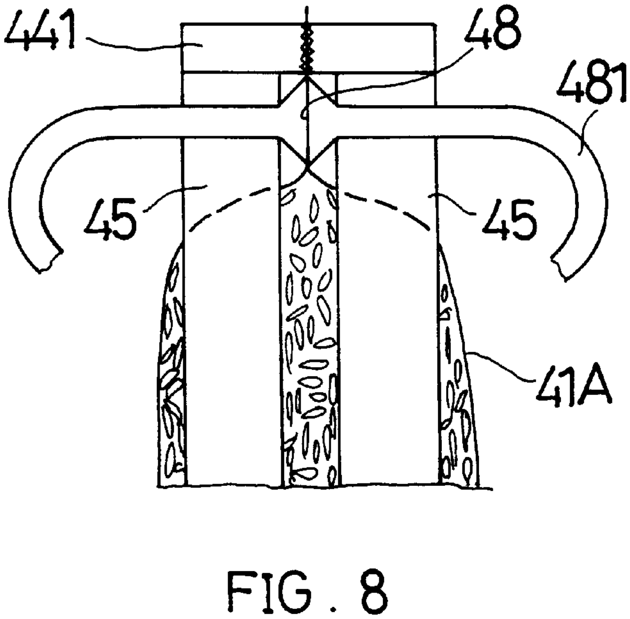
FIG. 8 shows that the transferring arms of FIG. 2 seal the top opening of the packing bag.

The metering section 51 counts the number of the coins inserted into the coin slit 12 and transforms the number into the amount of the rice. Also, the metering section 51 controls the amount of the transferred packing belt 41, that is, controls the length of the packing belt 41 to manufacture different packing bags 41A with different sizes for packing different amounts of rice. The operation section 52 coordinates the packing operation as shown in FIG. 4 by the following steps:

First step 521: The packing belt 41 is transferred via the rollers 43 to the space between the two transferring arms 45;

Second step 522: The bottom thermally sealing cutter 44 seals the bottom opening 411 of the packing belt 41 and cuts the same into a packing bag 41A as shown in FIG. 7;

Third step 523: The transferring arms 45 and sucking members 48 stretch the packing bag 41A and then the transferring arms 45 are rotated to move the opening of the packing bag 41A to a lower side of the metering section 51 for filling rice thereinto;

Fourth step 524: The stretching power source 49 makes the two transferring arms 45 close toward each other and then the top thermally sealing cutter 441 seals the top opening 412 of the packing bag 41A as shown in FIG. 8; and Fifth step 525: The packing bag 41A filled with the rice falls into the taking receptacle 112.

The present invention further includes a supplementing unit 6 disposed on inner side of the supplementing opening 14 of the housing 1. The supplementing unit 6 includes a vacuum sucking machine 61 and a pipeline 62 communicated with the rice container 2 and the supplementing opening 14. The vacuum sucking machine 61 serves to suck in the rice at the supplementing opening 14 and fill the rice into the rice container 2. Therefore, the labor for supplementing the rice and the times of opening the rice container 2 can be reduced so as to keep the cooling reservation effect of the rice.

In conclusion, the controlling unit 5 serves to control the rice vending machine and the packing unit 4 cooperatively completes the packing operation of the rice. Therefore, the rice cooled and reserved by the cooling unit 3 can be sold by retail. The cooling unit 3 is able to maintain the quality and taste of the rice and minimize the affection of temperature and humidity change on the rice. In addition, a consumer can purchase the rice as desired and eat up the rice in a short term without waste. Moreover, without any man, the rice vending machine can sell the rice without limitation of site and business time. The rice vending machine only needs to be periodically supplemented and maintained by a service man. Therefore, the rice selling cost can be lowered.

The above embodiment is only used to illustrate the present invention, not intended to limit the scope thereof. Many modifications of the above embodiment can be made without departing from the spirit of the present invention.

What is claimed is:

1. A rice vending machine comprising:

a housing formed with at least one taking opening, a coin slit, a heat radiating opening and a supplementing opening, the taking opening being communicated with a taking receptacle, the heat radiating opening being disposed with a fan driven by a power source;

a rice container for containing rice therein, a releasing port being disposed on lower side of the rice container, multiple cooling units being disposed on outer side of the rice container, the rice container being enclosed by a thermal retardation layer;

a packing unit including a belt reel on which a packing belt is disposed, multiple rollers and a sealing cutter disposed at a rear section of a travel of the packing belt, a pair of transferring arms being disposed on one side of the sealing cutter for transferring, clamping, planing, cutting, stretching and sealing the packing belt; and a controlling unit including a metering section and an operation section, the metering section counting a number of coins inserted into the coin slit and transforming the number into a amount of rice, the metering section also controlling the amount of the transferred packing belt to manufacture different packing bags with different sizes for packing different amounts of rice, the operation section coordinating the packing operation, after the rice is packed, the packed rice falls into the taking receptacle.

2. A rice vending machine as claimed in claim 1, wherein the cooling unit including a cooling chip and multiple heat radiating fins, the cooling chip being fixed on outer side of the rice container, the heat radiating fins being parallelly disposed on the cooling chip at equal intervals, a ventilation space being defined between the heat radiating fins for communicating with external environment.

3. A rice vending machine as claimed in claim 1, wherein the transferring arms are pivotally connected with a rotary shaft driven by a gear set.

4. A rice vending machine as claimed in claim 1, wherein each transferring arm is disposed with a sucking member communicated with a sucking room and a pump via a communicating tube, the pump being activated by an electromagnetic valve.

5. A rice vending machine as claimed in claim 1, wherein the transferring arm is formed with a central hollow section.

6. A rice vending machine as claimed in claim 3, wherein the gear set includes a gear disposed on the rotary shaft, a spiral rod meshing with the gear and a power source.

7. A rice vending machine as claimed in claim 1, further comprising a supplementing unit disposed on inner side of the supplementing opening of the housing, the supplementing unit including a vacuum sucking machine and a pipeline communicated with the rice container and the supplementing opening, the vacuum sucking machine serving to suck in the rice at the supplementing opening and fill the rice into the rice container.

8. A rice vending machine as claimed in claim 1, wherein a stretching power source and an angle controlling spring are disposed between the two transferring arms.

9. A rice vending machine as claimed in claim 1, wherein the sealing cutter includes a bottom thermally sealing cutter disposed at the rear section of the travel of the packing belt and a top thermally sealing cutter disposed at the free end of the transferring arms.

* * * * *